United States Patent [19]

Poe

[11] Patent Number: 5,419,672
[45] Date of Patent: May 30, 1995

[54] TAIL GATE HANGER

[76] Inventor: Jimmy Poe, 90 County Rd. 921, Selma, Ala. 36701

[21] Appl. No.: 199,428

[22] Filed: May 2, 1994

[51] Int. Cl.$^6$ .......................................... B66C 23/36
[52] U.S. Cl. .................... 414/540; 414/543; 414/462
[58] Field of Search ............... 414/539, 540, 542, 543, 414/546, 547, 550, 462, 563; 212/180, 232

[56] References Cited

U.S. PATENT DOCUMENTS

| | | | |
|---|---|---|---|
| 2,725,990 | 12/1955 | Androski | 414/543 |
| 2,925,922 | 2/1960 | Frenzel | 414/542 X |
| 3,095,099 | 6/1963 | Costello | 414/542 |
| 3,888,368 | 6/1975 | Hawkins | 212/180 X |
| 4,069,922 | 1/1978 | Hawkins | 414/543 X |
| 4,806,063 | 2/1989 | York | 212/180 X |
| 5,014,863 | 5/1991 | Vlaanderen | 414/543 X |
| 5,211,526 | 5/1993 | Robinette | 414/543 X |
| 5,281,078 | 1/1994 | Mills, Jr. | 212/180 X |

FOREIGN PATENT DOCUMENTS 0657326  9/1951  United Kingdom ............... 414/543

Primary Examiner—Michael S. Huppert
Assistant Examiner—James W. Keenan

[57] ABSTRACT

A tail gate hanger for hanging objects from and lifting objects onto the bed of a vehicle comprising an extensible and retractable telescopic rod having a base end for supporting the rod, a tip end for lifting objects with the rod, and an intermediate portion therebetween for holding the tip end at a position offset from the base end. A support is coupled to the base end and intermediate portion of the rod for holding the tip end in an upright position from a vehicle and allowing pivotal movement about the base end for lifting objects.

1 Claim, 3 Drawing Sheets

TAIL GATE HANGER

BACKGROUND OF THE INVENTION

1. Field of the Invention

The present invention relates to a tail gate hanger and more particularly pertains a tail gate hanger for hanging objects from and lifting objects onto the bed of a vehicle.

2. Description of the Prior Art

The use of hangers and hoists is known in the prior art. More specifically, hangers and hoists heretofore devised and utilized for the purpose of lifting objects onto the bed of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,068,762 to Kennard, Jr. discloses a pickup truck derrick, U.S. Pat. No. 4,216,941 to Little discloses a yoke hoist for use with pickup truck, U.S. Pat. No. 4,979,865 to Strickland discloses a loading and unloading apparatus for pickup trucks, U.S. Pat. No. 5,119,961 to Runn discloses an electric pickup winch, and U.S. Pat. No. 5,201,628 to Driver discloses a manually operated pickup truck hoist.

While these devices fulfill their respective, particular objective and requirements, the aforementioned patents do not describe a tail gate hanger which is portable, can be easily assembled and disassembled for use, and can be used from the bed of a truck or the trunk of a car.

In this respect, the tail gate hanger according to the present invention substantially departs from the conventional concepts and designs of the prior art, and in doing so provides an apparatus primarily developed for the purpose of hanging objects from and lifting objects onto the bed of a vehicle.

Therefore, it can be appreciated that there exists a continuing need for new and improved tail gate hanger which can be used for hanging objects from and lifting objects onto the bed of a vehicle. In this regard, the present invention substantially fulfills this need.

SUMMARY OF THE INVENTION

In the view of the foregoing disadvantages inherent in the known types of hangers and hoists now present in the prior art, the present invention provides an improved tail gate hanger. As such, the general purpose of the present invention, which will be described subsequently in greater detail, is to provide a new and improved tail gate hanger and method which has all the advantages of the prior art and none of the disadvantages.

To attain this, the present invention essentially comprises, in combination: an extensible and retractable rod having a tubular outer section and a tubular inner section telescopically received in the outer section, each section having an upper end and a lower end, each end having a pair of diametrically opposed apertures disposed thereon; a first rail having an aperture centrally disposed thereon and a second rail coupled edge to edge therewith to create a V-shaped pivotal support base adapted to be positioned in the bed of a vehicle; a first bolt and a complimentary nut, the first bolt having an eye on one end and a threaded portion on the other end, the eye adapted to hold a pulley therefrom for lifting objects, the threaded portion disposed through the apertures on the upper end of the inner section and secured with the nut; a second bolt and complimentary wing nut, the second bolt having an eye on one end and a threaded portion on the other end, the threaded portion disposed through the apertures on the lower end of the inner section and the upper end of the outer section and secured with the wing nut, whereby securing the rod in a linear configuration with a set height when the wing nut is tightened and allowing axial movement of the inner section relative to the outer section for extending or retracting the rod when the wing nut is loosened; a third bolt and complimentary wing nut, the third bolt having a head on one end and a threaded portion on the other end, the threaded portion disposed through the aperture on the first rail and the apertures on the lower end of the outer section and secured with the wing nut, whereby coupling the support base to the rod, thus allowing pivotal movement of the rod about the support base for lifting objects; a chain having two free ends with an intermediate portion therebetween; and a first hook, a second hook, and a third hook, the first hook and the second hook each coupled to a free end of the chain and adapted to be coupled to a vehicle for supporting the rod, the third hook coupled to the intermediate portion of the chain and through the eye of the second bolt for holding the rod in an upright position for lifting objects.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tail gate hanger which has all the advantages of the prior art hangers and hoists and none of the disadvantages.

It is another object of the present invention to provide a new and improved tail gate hanger which may be easily and efficiently manufactured and marketed.

It is a further object of the present invention to provide a new and improved tail gate hanger which is of durable and reliable construction.

An even further object of the present invention is to provide a new and improved tail gate hanger which is susceptible of a low cost of manufacture with regard to both materials and labor, and which accordingly is then susceptible of low prices of sale to the consuming public, thereby making such a tail gate hanger economically available to the buying public.

Still yet another object of the present invention is to provide a new and improved tail gate hanger which provides in the apparatuses and methods of the prior art some of the advantages thereof, while simultaneously overcoming some of the disadvantages normally associated therewith.

Even still another object of the present invention is to provide a new and improved tail gate hanger for hanging objects from and lifting objects onto the bed of a vehicle.

Even still another object of the present invention is to provide a new and improved tail gate hanger that is portable and may be easily assembled and disassembled in the field.

Even still another object of the present invention is to provide a new and improved tail gate hanger that can be transported in the bed of a vehicle.

Even still another object of the present invention is to provide a new and improved tail gate hanger that can be utilized from the trunk of a car.

Even still another object of the present invention is to provide a new and improved tail gate hanger that can be placed under a vehicle's seat or in the trunk when in the stowed configuration.

Even still another object of the present invention is to provide a new and improved tail gate hanger that can be utilized to lift, dress, and butcher deer and other big game animals.

Even still another object of the present invention is to provide a new and improved tail gate hanger that can be placed in a variety of angular configurations for lifting.

Lastly, it is an object of the present invention is to provide a new and improved tail gate hanger comprising an extensible and retractable telescopic rod having a base end for supporting the rod, a tip end for lifting objects with the rod, and an intermediate portion therebetween for holding the tip end at a position offset from the base end; and support means coupled to the base end and intermediate portion of the rod for holding the tip end in an upright position from a vehicle and allowing pivotal movement about the base end for lifting objects.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
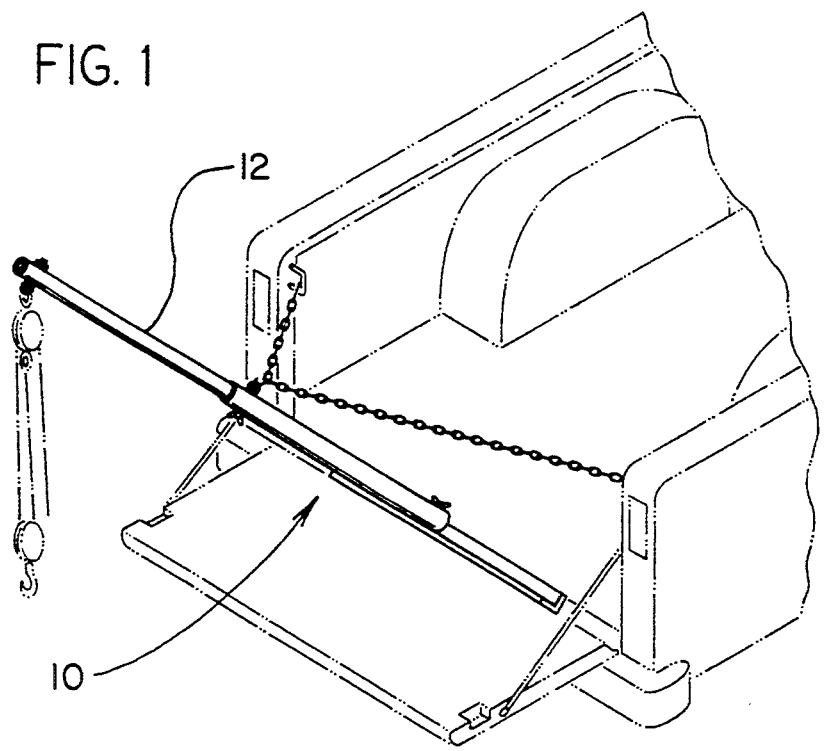
FIG. 1 is a perspective view of the preferred embodiment of the tail gate hanger constructed in accordance with the principles of the present invention.
Figure 2:
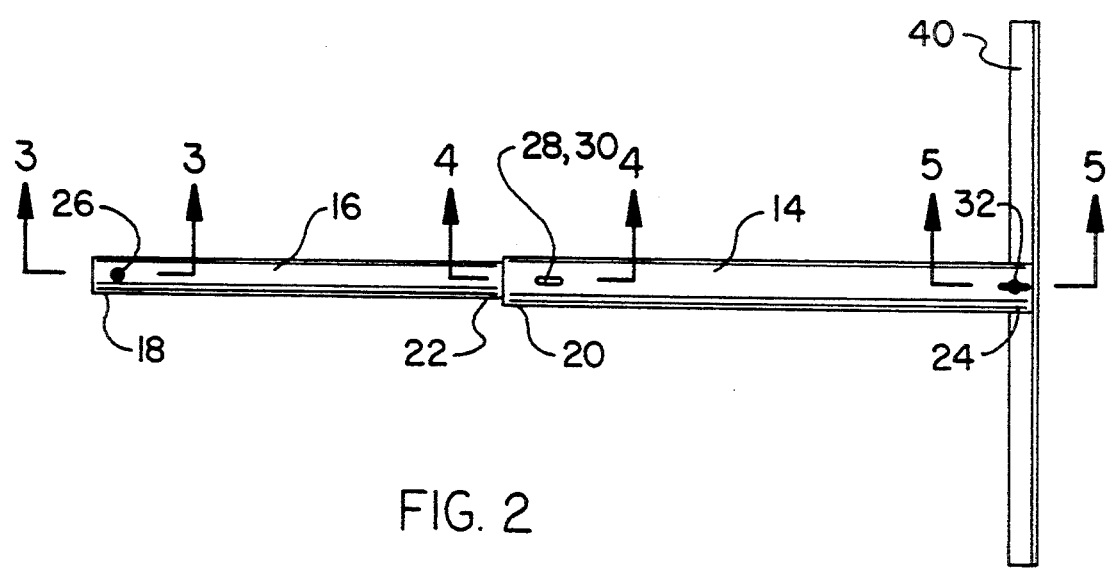
FIG. 2 is a plan view of the extendable rod and support base of present invention.
Figure 3:
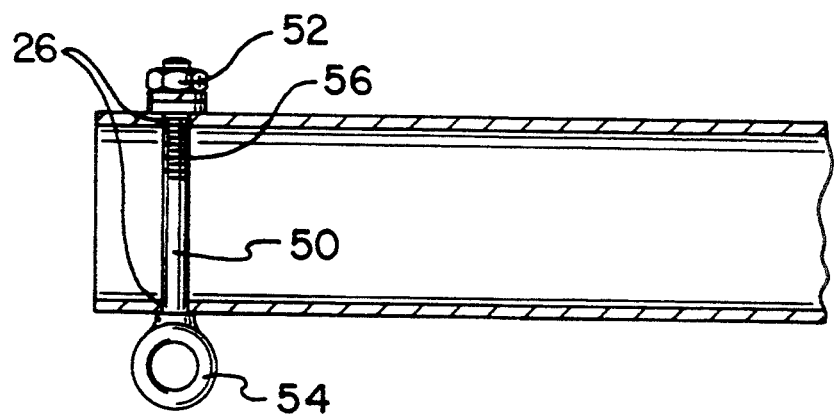
FIG. 3 is a view of the upper end of the inner section of the rod taken along the line 3—3 of FIG. 2.
Figure 4:
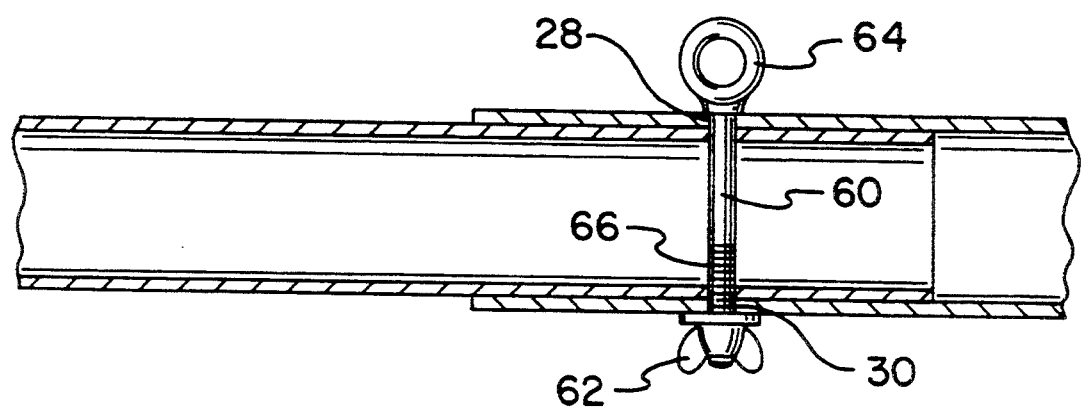
FIG. 4 is a view of the connection between the inner and outer sections of the retractable rod taken along the line 4—4 of FIG. 2.
Figure 5:
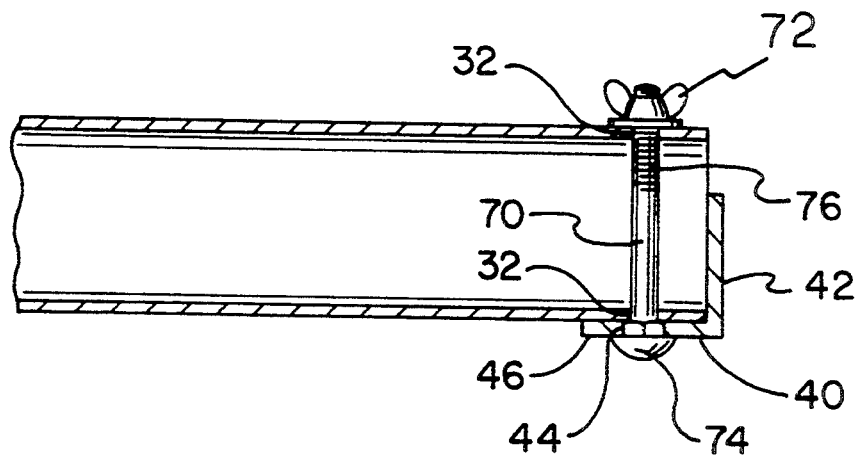
FIG. 5 is a view of the connection between the lower end of the outer section of the retractable rod and the V-shaped support base taken along the line 5—5 of FIG. 2.
Figure 6:
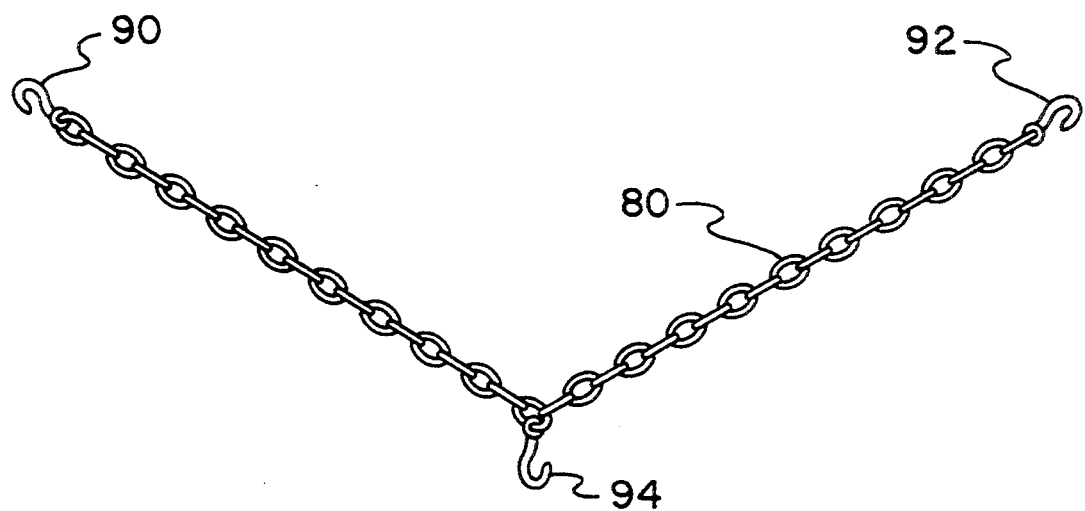
FIG. 6 is a view of the chain and hook used to place the rod of FIG. 1 in an upright orientation for lifting objects.

With reference now to the drawings, and in particular, to FIG. 1 thereof, the preferred embodiment of the new and improved tail gate hanger embodying the principles and concepts of the present invention and generally designated by the reference number 10 will be described.

Specifically, the present invention includes five major components. The major components are the rod, the support base, the bolts and complimentary nuts, the chain, and the plurality of hooks. These components are interrelated to provide the intended function.

More specifically, it will be noted in the various Figures that the first major component is the extensible and retractable rod 12. The rod has a tubular outer section 14 and a tubular inner section 16. The inner section is telescopically received in the outer section. Each section has an upper end 18, 20 and a lower end 22, 24. Each end has a pair of diametrically opposed apertures 26, 28, 30, 32 disposed thereon.

The second major component is a V-shaped support base 40. The support base includes a first rail 42 coupled edge to edge with a second rail 46. The first rail has an aperture 44 centrally disposed thereon for coupling with the rod. The support base is adapted to be positioned in the bed of a vehicle or trunk of a car for supporting the rod in an upright position. The support base is also adapted to allow the rod to pivot, whereby allowing items to be lifted off the vehicle's bed or trunk and then placed or the ground, or vice versa.

The third major component is a plurality of bolts with complimentary nuts. The device includes a first bolt 50 and a complimentary nut 52. The first bolt has an eye 54 on one end and a threaded portion 56 on the other end. The eye is adapted to hold a pulley therefrom for lifting objects. The threaded portion is disposed through the apertures 26 on the upper end of the inner section 16 and then secured with the nut 52. This coupling enables a pulley coupled through the eye 54 to be held in a stationary position.

The device also includes a second bolt 60 and a complimentary wing nut 62. The second bolt has an eye 64 on one end and a threaded portion 66 on the other end. The threaded portion is disposed through the apertures 28 on the lower end of the inner section 16 and the apertures 30 on the upper end of the outer section 14 and then secured with a wing nut. When the wing nut 62 is tightened, the rod is secured in a linear configuration with a set height established. When the wing nut 62 is loosened, the rod may be extended or retracted through axial movement of the inner section relative to the outer section, thus allowing the height of the rod to be adjusted.

The device also includes a third bolt 70 and a complimentary wing nut 72. The third bolt has a head 74 on one end and a threaded portion 76 on the other end. The threaded portion is disposed through the aperture 44 on the first rail 42 and the apertures 32 on the lower end 24 of the outer section and then secured with a wing nut, whereby coupling the support base to the rod. Pivotal movement of the rod with respect to the truck bed is effected through the support base coupled to the rod with the support base being located within a transverse recess of the vehicle bed where the bed and tailgate couple so that pivoting therebetween is effected and pivotal movement therebetween allowed without shifting of the support base with respect to the bed of the vehicle.

The fourth major component is a chain 80. The chain has two free ends with an intermediate portion therebetween. The chain is used to support the rod in an upright configuration for lifting objects.

The fifth major component is a plurality of hooks. The device includes a first hook 90, a second hook 92, and a third hook 94. The first hook and the second hook are each coupled to a free end of the chain. They are also adapted to be coupled to a vehicle for supporting the rod in an upright position. The third hook is coupled to the intermediate portion of the chain and is also coupled through the eye 64 of the second bolt. The first hook, second hook, and third hook combine to place the chain in a V-shaped orientation for holding the rod in an upright position for lifting objects.

A second embodiment of the present invention includes substantially all the components of the present invention further including positioning means for adjustably placing the base end of the rod at different locations on the bed of a vehicle. The positioning means allows a user greater leverage and flexibility in hanging and lifting objects with the rod.

In the preferred embodiment, the rod sections are formed of four foot steel pipe. The support base is made of steel with a dimension less than that of the width of a vehicle's bed or trunk. The base can also be formed in several sections to allow them to be easily stowed under the seat of a vehicle. The chain is about 75 inches in length. Conventional chain is utilized in constructing the hanger. Commercially available bolts, nuts, and hooks are utilized in constructing the hanger.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tail gate hanger for hanging objects from and lifting objects onto the bed of a vehicle comprising, in combination:

an extensible and retractable rod having a tubular outer section and a tubular inner section telescopically received in the outer section, each section having an upper end and a lower end, each end having a pair of diametrically opposed apertures disposed thereon;

a first rail having an aperture centrally disposed thereon and a second rail coupled edge to edge therewith to create a V-shaped pivotal support base adapted to be positioned in the bed of a vehicle;

a first bolt and a complimentary nut, the first bolt having an eye on one end and a threaded portion on the other end, the eye adapted to hold a pulley therefrom for lifting objects, the threaded portion disposed through the apertures on the upper end of the inner section and secured with the nut;

a second bolt and complimentary wing nut, the second bolt having an eye on one end and a threaded portion on the other end, the threaded portion disposed through the apertures on the lower end of the inner section and the upper end of the outer section and secured with the wing nut, thereby securing the rod in a linear configuration with a set height when the wing nut is tightened and allowing axial movement of the inner section relative to the outer section for extending or retracting the rod when the wing nut is loosened;

a third bolt and complimentary wing nut, the third bolt having a head on one end and a threaded portion on the other end, the threaded portion disposed through the aperture on the first rail and the apertures on the lower end of the outer section and secured with the wing nut, thereby coupling the support base to the rod, thus allowing pivotal movement of the rod and the support base with respect to the bed of the vehicle upon which it is located for lifting objects;

a chain having two free ends with an intermediate portion therebetween; and a first hook, a second hook, and a third hook, the first hook and the second hook each coupled to a free end of the chain and adapted to be coupled to a vehicle for supporting the rod, the third hook coupled to the intermediate portion of the chain and through the eye of the second bolt for holding the rod in an upright position for lifting objects.

* * * * *